(12) United States Patent
Han et al.

(10) Patent No.: US 9,354,476 B2
(45) Date of Patent: May 31, 2016

(54) WINDOW PANEL FOR A DISPLAY APPARATUS

(71) Applicant: Samsung Display Co., Ltd., Yongin, Gyeonggi-do (KR)

(72) Inventors: Soyeon Han, Yongin (KR); Kyu Young Kim, Yongin (KR); Gui-Nam Min, Yongin (KR); Kyu-taek Lee, Yongin (KR); Jongin Lee, Yongin (KR); Kyung Woo Han, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 140 days.

(21) Appl. No.: 14/134,493

(22) Filed: Dec. 19, 2013

(65) Prior Publication Data
US 2015/0043174 A1 Feb. 12, 2015

(30) Foreign Application Priority Data

Aug. 7, 2013 (KR) .......................... 10-2013-0093802

(51) Int. Cl.
| | |
|---|---|
| *G06F 1/16* | (2006.01) |
| *H05K 5/00* | (2006.01) |
| *H05K 7/00* | (2006.01) |
| *G02F 1/1345* | (2006.01) |

(52) U.S. Cl.
CPC .......... *G02F 1/13452* (2013.01); *G06F 1/1616* (2013.01); *G06F 1/1626* (2013.01); *G06F 1/1652* (2013.01); *G06F 1/1681* (2013.01); *Y10T 428/24273* (2015.01); *Y10T 428/24479* (2015.01); *Y10T 428/24802* (2015.01)

(58) Field of Classification Search
CPC ... G06F 1/16; G06F 1/1652; G02F 1/133305; G09F 9/301; H01L 51/0097; H01L 2251/5338; H01L 27/3244

USPC .................. 361/679, 679.55–679.58, 679.21, 361/679.26, 679.27, 679.09; 428/12; 156/298; 345/173; 248/917–924; 349/150, 58–60; 455/575.1–575.4, 455/56.1

See application file for complete search history.

(56) References Cited

U.S. PATENT DOCUMENTS

| 6,104,464 A | 8/2000 | Adachi |
|---|---|---|
| 2009/0096971 A1 | 4/2009 | Hioki |

(Continued)

FOREIGN PATENT DOCUMENTS

| JP | 2002-067592 | 3/2002 |
|---|---|---|
| JP | 2006-330334 | 12/2006 |
| JP | 2006-350205 | 12/2006 |
| KR | 10-2008-0073182 | 8/2008 |
| KR | 10-2010-0112383 | 10/2010 |

*Primary Examiner* — Hoa C Nguyen
*Assistant Examiner* — Roseline Alicea Rivera
(74) *Attorney, Agent, or Firm* — Knobbe Martens Olson & Bear LLP

(57) ABSTRACT

A window panel includes a first rigid part including a rigid material, a second rigid part including the rigid material, and a base substrate interposed between the first and second rigid parts and including a folding part configured to be folded by an external force. The folding part includes a first area and a second area, which are alternately arranged on a plane surface of the base substrate substantially perpendicular to a thickness direction of the base substrate. The first area includes the rigid material, and at least a portion of the second area includes a soft material. Thus, the rigidity of the window panel is maintained by the rigid material and the flexibility of the window panel is improved by the soft material.

19 Claims, 8 Drawing Sheets

(56) References Cited

U.S. PATENT DOCUMENTS

2010/0002402 A1* 1/2010 Rogers et al. ............... 361/749
2013/0002572 A1 1/2013 Jin et al.
2014/0065326 A1* 3/2014 Lee et al. .................. 428/12
2015/0004334 A1* 1/2015 Bae et al. .................. 428/12

* cited by examiner

WINDOW PANEL FOR A DISPLAY APPARATUS

CROSS-REFERENCE TO RELATED APPLICATIONS

This application claims priority to, and the benefit of, Korean Patent Application No. 10-2013-0093802, filed on Aug. 7, 2013, the contents of which are hereby incorporated by reference in entirety.

BACKGROUND

1. Field

The present disclosure relates to a window panel having improved flexibility, a display apparatus having the window panel, and a method of manufacturing the window panel.

2. Description of the Related Technology

Electronic equipments, such as a smart phone, a digital camera, a notebook computer, a navigation device, a smart television, and the like, include an image display apparatus to display an image. The image display apparatus includes a display panel that generates and displays the image, and a window panel disposed on the display panel to protect the display panel.

In recent years, a flexible display panel has been developed. The flexible display panel is formed of a plastic material with flexibility, and thus the flexible display panel has a flexible property.

A window panel applied to the flexible display panel is required to have a rigidity to protect the flexible display panel from external impacts, but still have the flexibility.

SUMMARY OF CERTAIN INVENTIVE ASPECTS

Embodiments provide a window panel including at least one substrate including a first rigid part that includes a rigid material, a second rigid part that includes the rigid material, and a folding part interposed between the first and second rigid parts and configured to be folded by an external force. The folding part includes a first area comprising the rigid material, and a second area, where at least a portion of the second area comprises a material softer than the rigid material, where the first and second areas are alternately arranged on a plane surface of the folding part substantially perpendicular to a thickness direction of the base substrate.

The first and second rigid parts are arranged in a first direction, and the first and second areas are extended in a second direction substantially perpendicular to the first direction and alternately arranged in the first direction.

The folding part includes a hole formed through the base substrate corresponding to the second area and the hole is filled with the soft material.

The folding part includes a recess formed by partially recessing the base substrate corresponding to the second area and the recess is filled with the soft material.

The window panel further includes at least one soft layer disposed on the base substrate and formed of the soft material.

The at least one base substrate and the at least one soft layer are alternately stacked.

The window panel further includes a flexible cover film disposed on the soft layer, and the flexible cover film has a rigidity greater than a rigidity of the soft layer.

The soft material includes a silica ball.

The soft material has a refractive index substantially similar to a refractive index of the rigid material.

The soft material comprises a polymer resin.

The rigid material comprises a glass or a rigid resin film.

Embodiments provide a display apparatus including a display panel that displays an image and a window panel disposed on the display panel to protect the display panel. The window panel includes a first rigid part that includes a rigid material, a second rigid part that includes the rigid material, and a base substrate interposed between the first and second rigid parts and including a folding part configured to be folded by an external force. The folding part includes a first area and a second area alternately arranged on a plane surface of the base substrate substantially perpendicular to a thickness direction of the base substrate, the first area including the rigid material, and at least a portion of the second area including a soft material.

The first and second rigid parts are arranged in a first direction, the first and second areas are extended in a second direction substantially perpendicular to the first direction and alternately arranged in the first direction.

The folding part includes a hole formed through the base substrate corresponding to the second area and the hole is filled with the soft material.

The folding part includes a recess formed by partially recessing the base substrate corresponding to the second area and the recess is filled with the soft material.

Embodiments provide a method of manufacturing a window panel including disposing a base substrate comprising a rigid material and a mother substrate, the base substrate including a first rigid part, a second rigid part, and a folding part disposed between the first and second rigid parts and configured to be folded by an external force, etching at least a portion of the base substrate in the second area on a plane surface substantially perpendicular to a thickness direction of the base substrate, filling the etched at least portion of the second area with a soft material having a flexibility, and separating the mother substrate from the base substrate.

The method further includes distributing silica balls in the soft material.

The method further includes providing the soft material on the base substrate to form a soft layer on the base substrate.

The method further includes forming a cover film on the soft layer, wherein the cover film has a flexibility and a rigidity greater than a rigidity of the soft material.

According to the above, the window panel includes the folding part in which the rigid material and the soft material are alternately arranged with each other. Thus, the rigidity of the window panel is maintained by the rigid material and the flexibility of the window panel is improved by the soft material.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION OF CERTAIN INVENTIVE EMBODIMENTS

Figure 1:
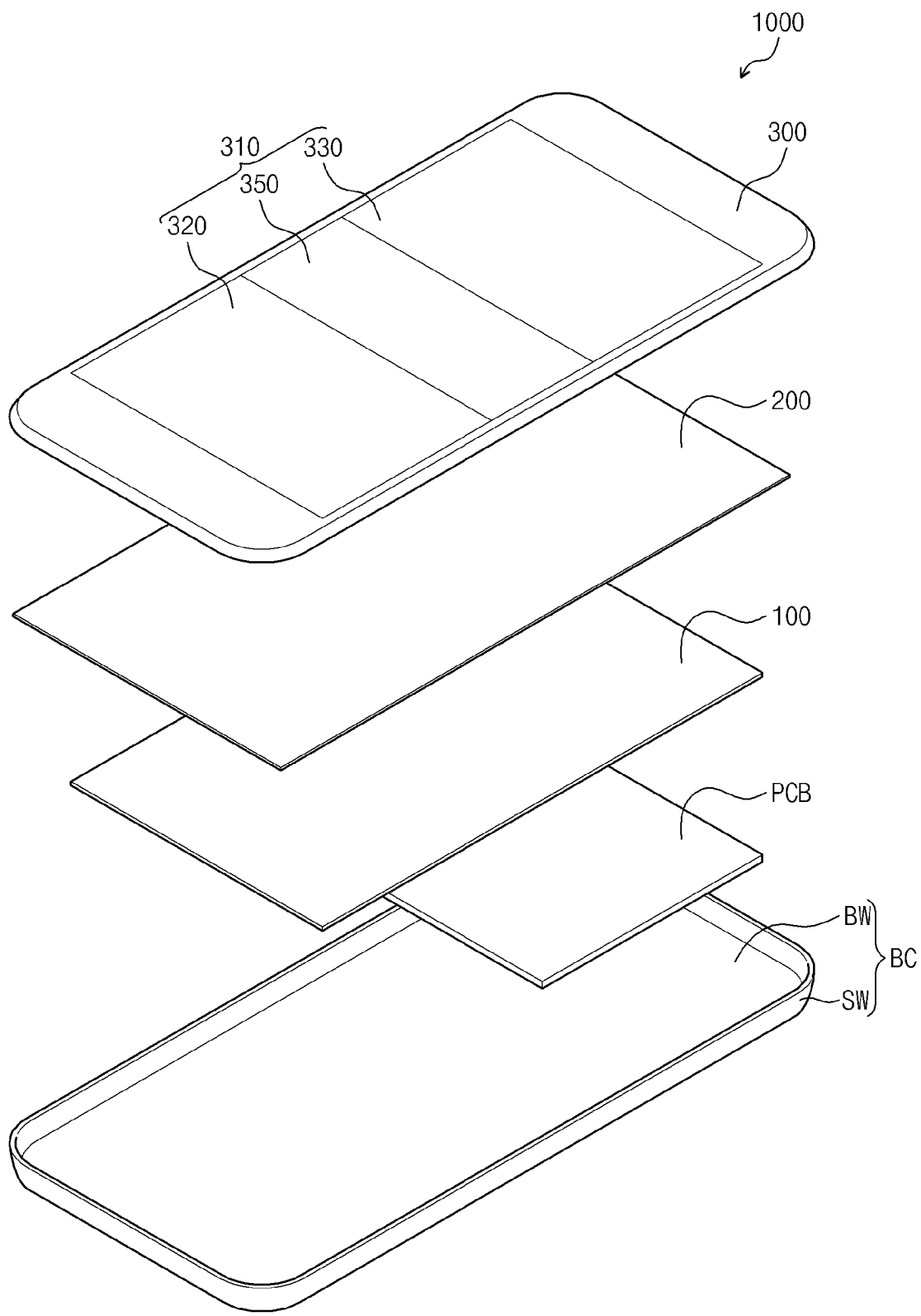
FIG. 1 is an exploded perspective view showing a display apparatus according to an embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers generally refer to like elements throughout. As used herein, the term "and/or" includes any and all combinations of one or more of the associated listed items.

It will be understood that, although the terms first, second, and the like, may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

FIG. 1 is an exploded perspective view showing a display apparatus according to an embodiment of the present disclosure.

Referring to FIG. 1, a display apparatus 1000 includes a bottom chassis BC, a printed circuit board PCB, a display panel 100, a touch panel 200, and a window panel 300.

FIG. 1 shows a mobile phone as the display apparatus 1000 as a representative example, but the display apparatus 1000 should not be limited to the mobile phone. That is, the display apparatus 1000 may be applied to various image information displays, such as, for example, a television set, a navigator, a computer monitor, a game console, and the like.

The display panel 100 displays an image. The display panel 100 may be, for example, an organic light emitting display panel, a liquid crystal display panel, a plasma display panel, an electrophoretic display panel, or an electrowetting display panel.

The display panel 100 may be, for example, a thin film transistor substrate in which thin film transistors are arranged in a matrix form as switching devices. Each thin film transistor includes a source electrode connected to a data line, a gate electrode connected to a gate line, and a drain electrode connected to a pixel electrode formed of a transparent conductive material. The pixel electrode is electrically connected to a pixel that generates the image.

The printed circuit board PCB includes a timing controller to generate a data driving signal and a gate driving signal. The data and gate driving signals are applied to the display panel 100 through tape carrier packages. Gate and data drivers (not shown) control the thin film transistors in response to the data and gate driving signals.

The touch panel 200 is disposed between the window panel 300 and the display panel 100 to receive a touch signal provided from the outside of the window panel 300. The touch signal is generated when a user touches the window panel 300. The touch panel 200 converts the touch signal to an electrical signal and applies the electrical signal to the display panel 200.

The bottom chassis BC is disposed under the printed circuit board PCB and the display panel 100, and accommodates the printed circuit board PCB and the display panel 100 therein. The bottom chassis BC includes a bottom wall BW and a sidewall SW. The bottom wall BW has a rectangular shape and the sidewall SW extended upward from an edge of the bottom wall BW. A receiving space is defined in the bottom chassis BC by the sidewall SW and the bottom wall BW, and the printed circuit board PCB and the display panel 100 are accommodated in the receiving space.

The display apparatus 1000 is a flexible display apparatus. Components included in the display apparatus 1000 are formed of a material having a flexibility, such as, for example, a plastic material. Accordingly, the display apparatus 1000 may be repeatedly folded and unfolded along a constant radius of curvature or with respect to a predetermined imaginary line.

The window panel 300 is disposed on the display panel 100 to protect the display panel 100 from external impacts. The window panel 300 includes a transparent material and transmits the image displayed on the display panel 100, and thus the image is provided to the user. The window panel 300 has a shape corresponding to that of the display panel 100 and covers the display panel 100. A functional coating layer (not shown) may be further disposed on the window panel 300. The functional coating layer includes an anti-fingerprint coating layer to prevent a finger print of the user from being left on the window panel 300 and an anti-reflection coating layer to prevent an external light from being reflected to the user.

The window panel 300 includes a base substrate 310 configured to include a first rigid part 320, a second rigid part 330, and a folding part 350. The first and second rigid parts 320 and 330 are formed of a rigid material. The rigid material is an optically transparent material, but has high rigidity and strength in physics. For example, the rigid material may be a material having no flexibility such as glass or rigid resin film. Therefore, the first and second rigid parts 320 and 330 do not have flexibility, and thus the first and second rigid parts 320 and 330 are not bent or folded.

The folding part 350 is disposed between the first and second rigid parts 320 and 330, and is configured to be folded by an external force applied thereto. Thus, the window panel 300 may be folded by the folding part 350.

Figure 2:
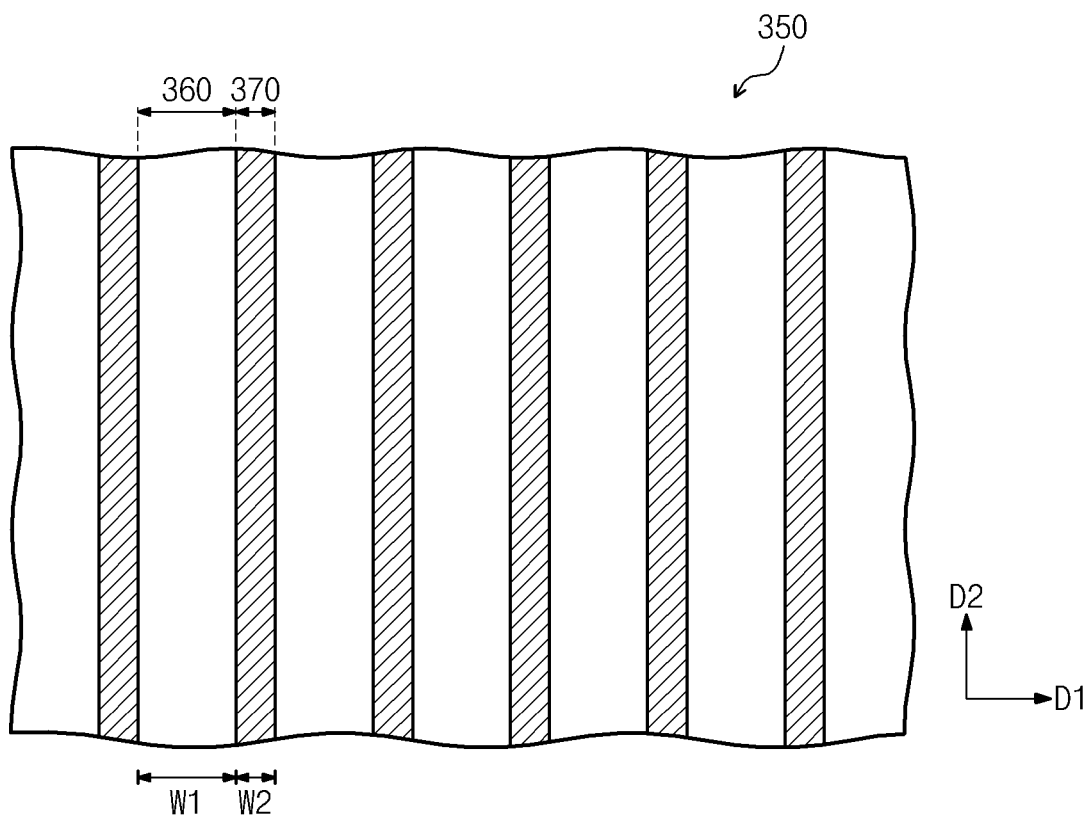
FIG. 2 is a partially enlarged plan view showing a folding part shown in FIG. 2.
Figure 3:
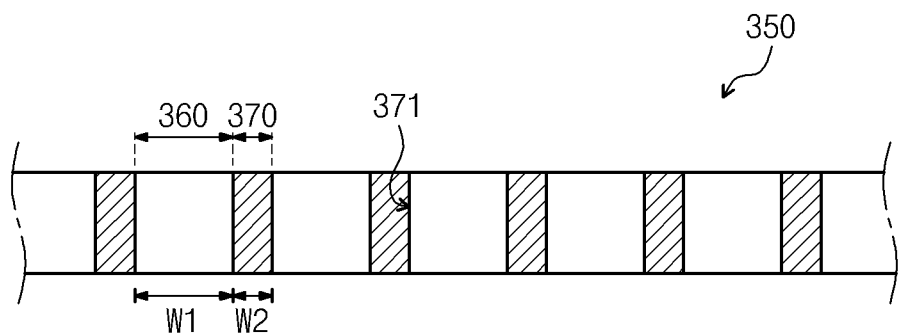
FIG. 3 is a side view showing the folding part shown in FIG. 2.

FIG. 2 is a partially enlarged plan view showing the folding part shown in FIG. 2, and FIG. 3 is a side view showing the folding part shown in FIG. 2.

Referring to FIG. 2, the folding part 350 has a structure which can be folded by the external force. The folding part 350 includes a first area 360 and a second area 370. The first and second areas 360 and 370 are alternately arranged with each other on a plane surface substantially perpendicular to a thickness direction of the base substrate 310. The first and second areas 360 and 370 are extended in a second direction D2 substantially perpendicular to a first direction D1 in which the first and second rigid parts 320 and 330 are arranged.

The first area 360 includes a rigid material to improve the rigidity and strength of the folding part 350. In addition, the first area 360 significantly improves puncture resistance of the folding part 350.

The second area 370 allows the folding part 350 to be folded by the external force. At least a portion of the second area 370 includes a soft material, which is softer than the rigid material. All the second area 370 is formed with the soft material, or a portion of the second area 370 is formed with the soft material and the other portion of the second area 370 is formed with the rigid material. The soft material is optically transparent, but, physically, the soft material has low rigidity and strength. As an example, the soft material may be, but not limited to, a silicon-based resin, an optically clear resin (OCR), or an optically clear adhesive, which has flexibility, and is configured to be tensioned or compressed by the external force.

In addition, the soft material has substantially the same refractive index as that of the rigid material for index matching between the soft material and the rigid material. When the indices between the soft material and the rigid material are matched, transmissivity and visibility of the window panel 300 are improved.

Referring to FIG. 3, the folding part 350 includes a hole 371 formed therethrough to correspond to the second area 370. The hole 371 is filled with the soft material. Therefore, the soft material and the rigid material have an island structure with a bar shape, which are extended in the second direction D2 and are alternately arranged with each other in the first direction D1.

The first and second areas 360 and 370 respectively have widths W1 and W2, each of which is in a range from about tens of micrometers to about thousands of micrometers. The width W1 of the first area 360 is wider than the width W2 of the second area 370 to improve the rigidity and strength of the base substrate 310. As an example, the widths W1 and W2 of the first and second areas 360 and 370 are about 3 millimeters and about 70 micrometers, respectively. The base substrate 310 has a thickness of about hundreds of micrometers. However, the second area 370 of the folding part 350 should not be limited thereto or thereby.

Figure 4:
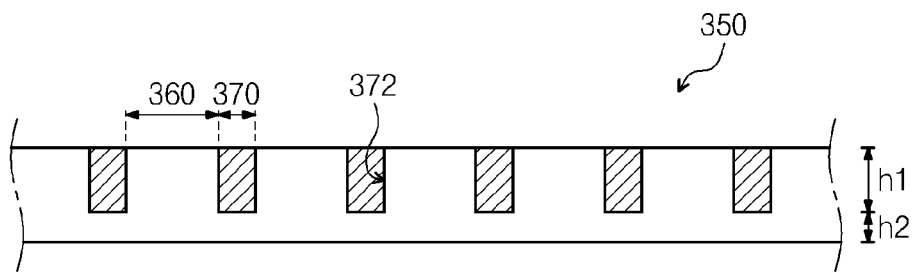
FIG. 4 is a partially enlarged side view showing a folding part according to another embodiment of the present disclosure.

FIG. 4 is a partially enlarged side view showing a folding part according to another embodiment of the present disclosure.

Referring to FIG. 4, a folding part 350 includes a recess 372 recessed from an upper surface of the base substrate 310 to correspond to the second area 370. The recess 372 is filled with the soft material. Accordingly, the rigid material has a concavoconvex shape, and the recess 372, for example, a concave portion of the rigid material, is filled with the soft material.

The recess 372 has a depth h1 enough to allow the thickness of the rigid material in the second area 370 to be thin. For example, when the rigid material is a glass material, the glass material has a thickness h2 equal to or smaller than about 100 micrometers. In general, since the rigid material has a stress to resist to external pressure or tensile force and no flexibility, the rigid material is broken down by the external force. However, when the thickness of the rigid material becomes sufficiently thin, the rigid material may have some flexibility, and thus the second area 370 may be tensioned or compressed by the external force.

When compared to the folding part 350 provided with the hole 371, the rigid material having a uniform thickness is provided in the second area 370 in case of the folding part 350 provided with the recess 372. Thus, the rigidity, strength, and puncture resistance of the second area 370 may be significantly improved.

As described above, the folding part 350 includes the soft material and the rigid material, which are alternately arranged with each other. Therefore, when the external force is applied to the folding part 350, the second area 370 is tensioned or compressed and the folding part 350 is folded by the external force.

Figure 5:
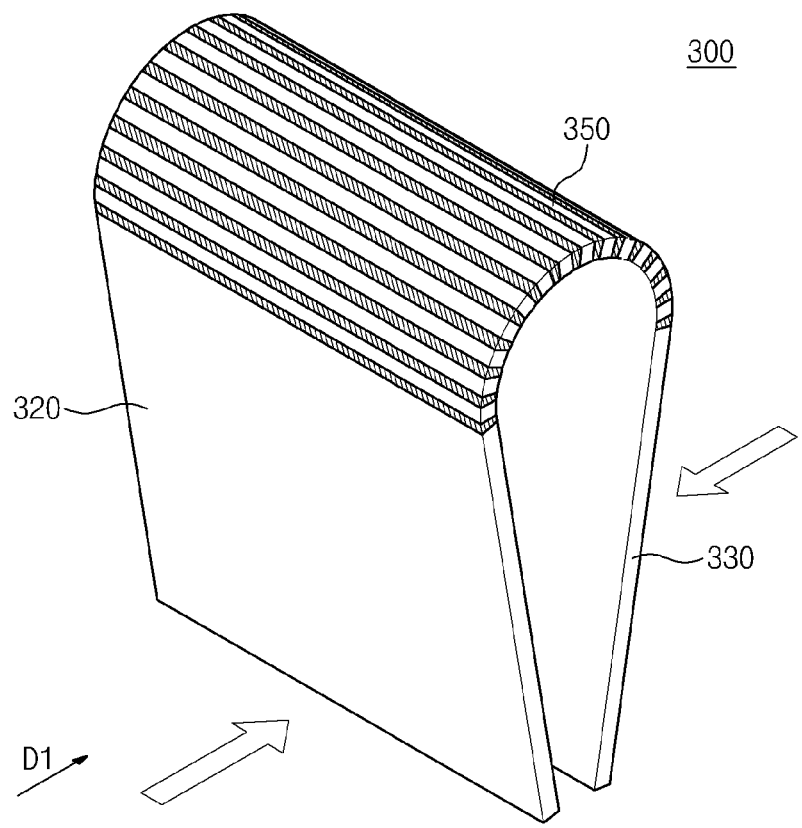
FIG. 5 is a perspective view showing a window panel that is folded.
Figure 6:
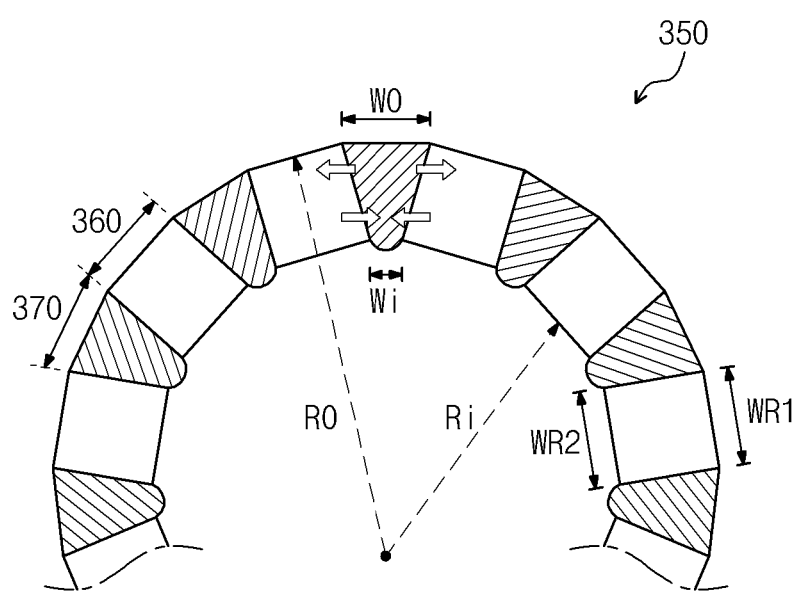
FIG. 6 is an enlarged side view showing a folding part of the folded window panel shown in FIG. 5.

FIG. 5 is a perspective view showing a window panel that is folded and FIG. 6 is an enlarged side view showing the folding part of the folded window panel shown in FIG. 5.

Referring to FIG. 5, the window panel 300 is folded. When the external force is applied to the first and second rigid parts 320 and 330 in the first direction D1 and an opposite direction to the first direction D1, the first and second rigid parts 320 and 330 are not folded and only the folding part 350 is folded. That is, the first rigid part 320 faces the second rigid part 330 since the folding part 350 is folded. Consequently, the window panel 300 is folded in the direction, to which the external force is applied, with respect to the folding part 350.

Referring to FIG. 6, the folding part 350 is inwardly folded. Here, the folding part 350 has a constant thickness, and thus a radius of curvature of an inner surface of the folding part 350 is different from a radius curvature of an outer surface of the folding part 350. The inner surface of the folding part 350 is bent at a first radius of curvature Ri and the outer surface of the folding part 350 is bent at a second radius of curvature Ro. In this case, the first radius of curvature Ri is smaller than the second radius of curvature Ro.

Since a length of the inner side of the folding part 350 after the folding part 350 is bent becomes shorter than a length of the inner side of the folding part 350 before the folding part 350 is bent, the inner side of the folding part 350 is contracted. Accordingly, a compressive external force is applied to the inner side of the folding part 350 along the first radius of curvature Ri. On the other hand, since a length of the outer side of the folding part 350 after the folding part 350 is bent becomes longer than a length of the outer side of the folding part 350 before the folding part 350 is bent, the outer side of the folding part 350 is expanded. Accordingly, a tensile external force is applied to the outer side of the folding part 350 along the second radius of curvature Ro.

The first area 360 includes the rigid material, and thus the rigid material is not deformed since the stress occurs in the rigid material to resist to the external force. Therefore, inner and outer widths WR1 and WR2 of the first area 370 are not changed.

However, the second area 370 includes the soft material and the stress does not occur in the soft material with respect to the external force. Accordingly, the soft material is deformed by a difference between the external force and the stress. Consequently, an inner width Wi of the second area 370 is decreased by the compressive external force and an outer width Wo of the second area 370 is increased by the tensile external force. As described above, the folding part 350 is bent by the deformation of the soft material of the second area 370, and thus the base substrate 310 and the window 300 may be folded.

Figure 7:
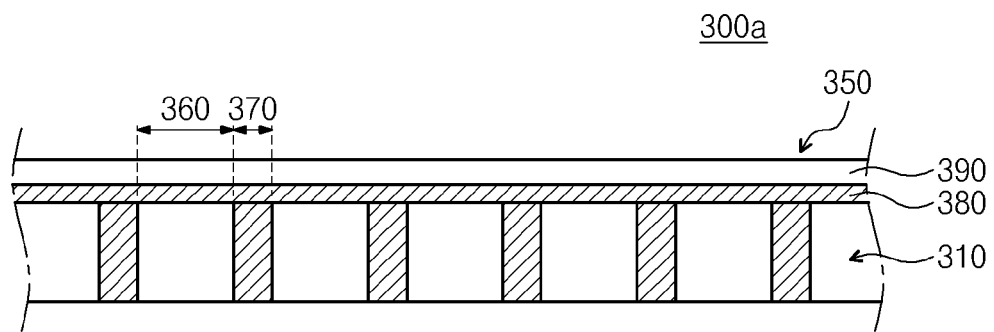
FIG. 7 is a side view showing a window panel according to another embodiment of the present disclosure.

FIG. 7 is a side view showing a window panel according to another exemplary embodiment of the present disclosure. In FIG. 7, the same reference numerals denote the same elements in FIGS. 2 to 6, and thus detailed descriptions of the same elements will be omitted.

Referring to FIG. 7, a window panel 300a further includes a soft layer 380 and a cover film 390, which are sequentially stacked on the base substrate 310. The soft layer 380 is disposed on the base substrate 310 and covers the upper surface of the window panel 300a to improve the rigidity, strength, and touch sensitivity of the window panel 300a. The soft layer 380 includes the soft material. As described above, the soft material has flexibility and has substantially the same refractive index as that of the rigid material for index matching between the soft material and the rigid material.

The cover film 390 is disposed on the soft layer 380 to cover an upper surface of the soft layer 380. The cover film 390 may be, but is not limited to, a polymer film having the flexibility and higher strength than that of the soft layer 380, such as, for example, polyethylene teraphthalate (PET). The soft layer 380 has an adhesive property, and thus the cover film 390 may be attached to the base substrate 310 by the soft layer 380.

As described above, when the soft layer 380 and the cover film 390 are disposed on the base substrate 310, the rigidity and strength of the window panel 300a may be improved. In addition, since the rigid material and the soft material of the first and second areas 360 and 370 alternately arranged with each other are attached to the cover film 390, durability of the folding part 350 may be improved. In particular, fine concave and convex portions are formed on the upper surface of the folding part 350. The soft layer 380 and the cover film 390 planarize the fine concave and convex portions, so that the touch sensibility may be improved.

Figure 8:
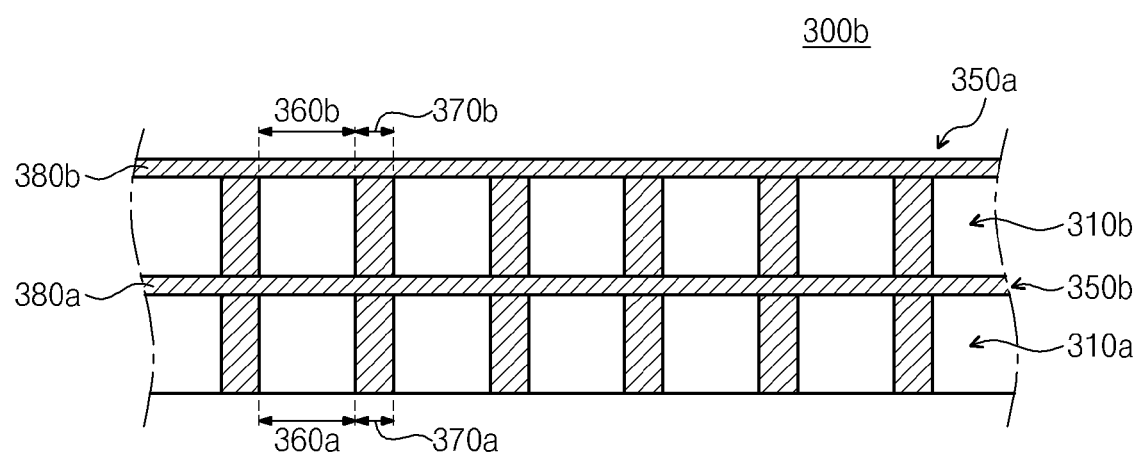
FIG. 8 is a side view showing a window panel according to another embodiment of the present disclosure.

FIG. 8 is a side view showing a window panel according to another embodiment of the present disclosure. In FIG. 8, the same reference numerals denote the same elements in FIGS. 2 to 6, and thus detailed description of the same elements will be omitted.

Referring to FIG. 8, a window panel 300b includes a plurality of base substrates and a plurality of soft layers. In this embodiment, two base substrates and two soft layers will be described as shown in FIG. 8, but the number of the base substrates and the soft layers should not be limited thereto or thereby.

The base substrates improve the rigidity and strength of the window panel 300b. The base substrates are configured to include a first base substrate 310a and a second substrate 310b. The first and second base substrates 310a and 310b have the same structure and function as those of the base substrate 310 shown in FIGS. 2 to 6. The second base substrate 310b is disposed on the first base substrate 310a. At least a portion of a second folding part 350b of the second base substrate 310b is overlapped with at least a portion of a first folding part 350a of the first base substrate 310a. For example, as shown in FIG. 8, the first and second folding parts 350a and 350b are completely overlapped with each other such that a first area 360a of the first folding part 350a is overlapped with a first area 360b of the second folding part 350b and a second area 370a of the first folding part 350a is overlapped with a second area 370b of the second folding part 350b. Therefore, the first and second base substrates 310a and 310b are stacked to overlap with each other, and thus the rigidity and strength of the window panel 300b may be improved.

The soft layers are alternately arranged with the base substrates to improve the flexibility and touch sensibility of the window panel 300b. The soft layers are configured to include a first soft layer 380a and a second soft layer 380b. The first and second soft layers 380a and 380b have the same structure and function as those of the soft layers 380 show in FIGS. 2 to 6. The first soft layer 380a is disposed between the first and second base substrates 310a and 310b, and the second soft layer 380b is disposed on the second base substrate 310b. The first soft layer 380a attaches the first base substrate 310a to the second base substrate 310b. In addition, the first soft layer 380a planarizes fine concave and convex portions on the first folding part 350a of the first base substrate 310a. In particular, when the window panel 300b is folded, the first and second base substrates 310a and 310b provide stress to each other since the first and second base substrates 310a and 310b are bent at different radius of curvatures. In this embodiment, the first soft layer 380a includes the soft material, and thus the first soft layer 380a disposed between the first and second base substrates 310a and 310b relieves the stress between the first and second base substrates 310a and 310b. The second soft layer 380b planarizes fine concave and convex portions of the second folding part 350b.

As described above, when the window panel 300b includes the base substrates, the rigidity and strength of the window panel 300b may be improved.

Figure 9:
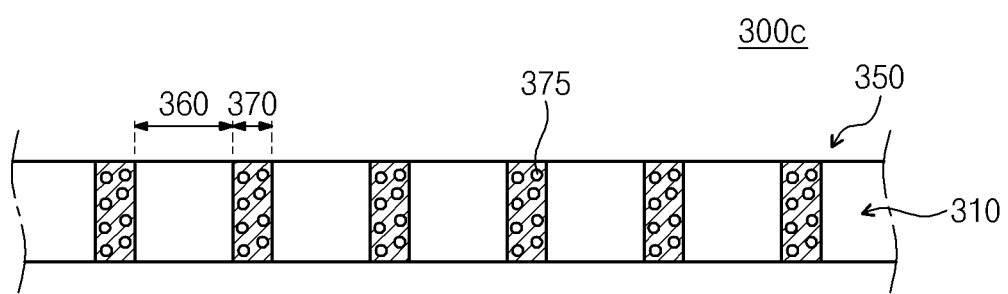
FIG. 9 is a side view showing a window panel according to another embodiment of the present disclosure.

FIG. 9 is a side view showing a window panel according to another embodiment of the present disclosure. In FIG. 8, the same reference numerals denote the same elements in FIGS. 2 to 6, and thus detailed description of the same elements will be omitted.

Referring to FIG. 9, a window panel 300c includes silica balls 375 distributed in the second area 370 of the folding part 350. The silica balls 375 are distributed in the second area 370 to improve the rigidity and strength of the window panel 300c. Each of the silica balls 375 has a circular shape and a diameter of a few micrometers to tens of micrometers and is made from silica, and thus the silica balls 375 have high rigidity and strength. The silica balls 375 are distributed in the soft material provided to the second area 370, so that the silica balls 375 are disposed in the second area 370. Therefore, the rigidity and strength of the second area 370 are improved by the silica balls 375, and the puncture resistance of the second area 370 is significantly improved.

FIGS. 10A to 10E are views showing a method of manufacturing the window panel according to an embodiment of the present disclosure. In one embodiment, the manufacturing method of the window panel 300a shown in FIG. 7 is described.

Referring to FIGS. 10A to 10E, the method of manufacturing the window panel 300a includes providing the rigid material, etching the rigid material, filling the second area 370, forming the soft layer 380 and the cover film 390, and separating a mother substrate 305.

Figure 10A:
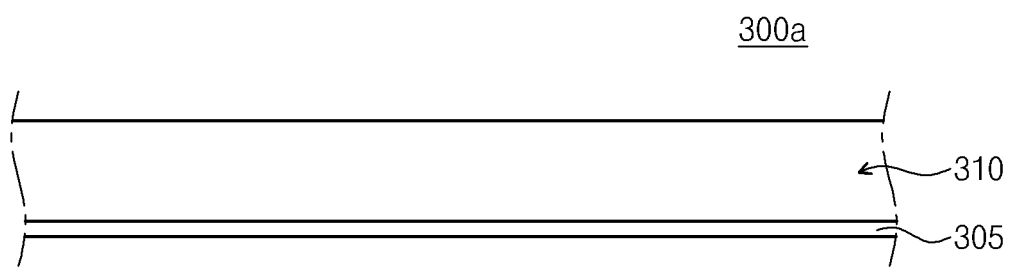
FIGS. 10A to 10E are views showing a method of manufacturing a window panel according to an embodiment of the present disclosure.

FIG. 10A shows providing the rigid material.

Referring to FIG. 10A, the rigid material is provided on the mother substrate 305 to form the base substrate 310.

Figure 10B:
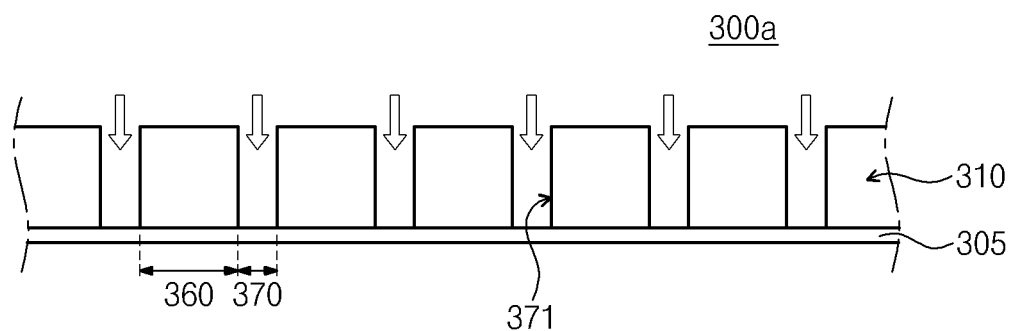

FIG. 10B shows etching the rigid material.

Referring to FIG. 10B, a portion of the rigid material is etched in the second area 370 to expose a portion of the mother substrate 305. The etching of the rigid material is performed by irradiating a laser beam onto the rigid material. The laser beam etches the rigid material in the second area 370 of the folding part 350. When the rigid material is completely etched in the second area 370 by the laser beam, the hole 371 is formed penetrating through the second area 370, and the rigid material in the first area 360 is disposed on the mother substrate 305. When the rigid material in the second area 370 is partially etched by the laser beam, the recess 372 (refer to FIG. 4) having a predetermined depth is formed in the second area 370. As described above, the rigid material is etched in the second area 370, and thus the hole 371 is formed in the second area 370.

Figure 10C:
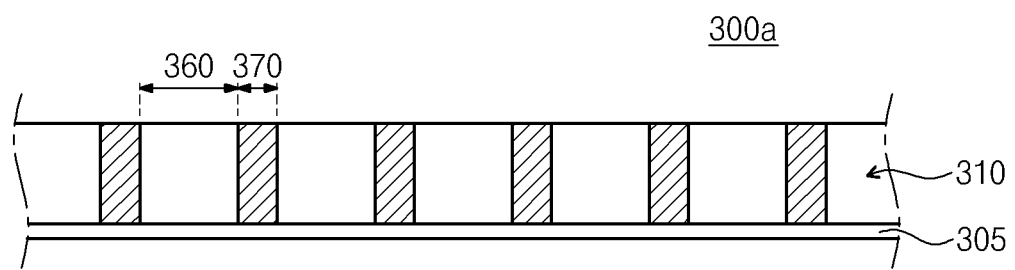

FIG. 10C shows filling the second area 370.

Referring to FIG. 10C, the second area 370 is filled with the soft material. The soft material is provided to the second area 370 to fill the hole 371 in the second area 370. The soft material is formed to have the same height as that of the rigid material formed in the first area 360. This is to prevent the fine concave and convex portions from being formed due to the difference in height between the rigid material in the first area 360 and the soft material in the second area 370.

Figure 10D:
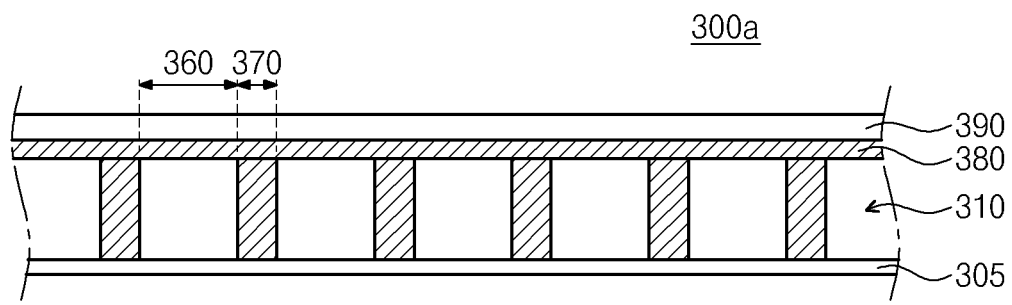

FIG. 10D shows forming the soft layer and the cover film.

Referring to FIG. 10D, the soft layer 380 and the cover film 390 are sequentially stacked on the base substrate 310. The soft layer 380 is disposed on the base substrate 310 to cover the upper surface of the base substrate 310 and the cover film 390 is disposed on the soft layer 380 to cover the upper surface of the soft layer 380. The soft layer 380 has an adhesive property, and thus the cover film 390 is attached to the base substrate 310 by the soft layer 380.

Figure 10E:
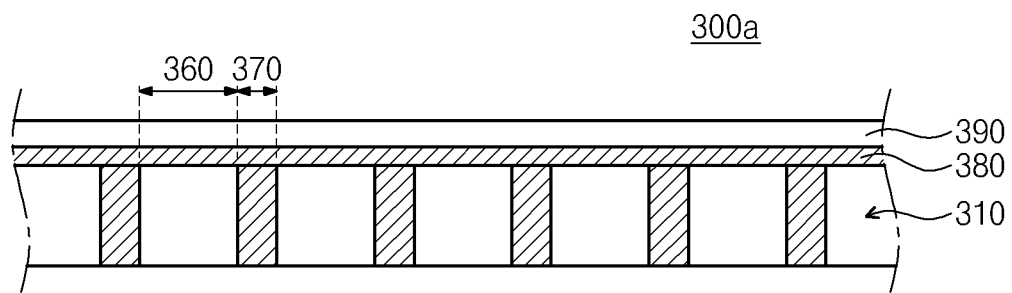

FIG. 10E shows separating the mother substrate 305.

Referring to FIG. 10E, the mother substrate 305 is separated from the lower surface of the base substrate 310.

Although certain embodiments of the present invention have been described, it is understood that the invention should not be limited to these embodiments but various changes and modifications can be made by one ordinary skilled in the art within the spirit and scope of the present invention as hereinafter claimed.

What is claimed is:

1. A window panel comprising:
at least one base substrate comprising:
a first rigid part that includes a rigid material,
a second rigid part that includes the rigid material; and
a folding part interposed between the first and second rigid parts and configured to be folded by an external force,
wherein the folding part comprises:
a first area comprising the rigid material, and
a second area, wherein at least a portion of the second area comprises a material softer than the rigid material
wherein the first and second areas are alternately arranged on a plane surface of the folding part substantially perpendicular to a thickness direction of the base substrate.

2. The window panel of claim 1, wherein the first and second rigid parts are arranged in a first direction, and the first and second areas are extended in a second direction substantially perpendicular to the first direction and alternately arranged in the first direction.

3. The window panel of claim 2, wherein the folding part comprises a hole formed through the base substrate corresponding to the second area wherein the hole is filled with the soft material.

4. The window panel of claim 2, wherein the folding part comprises a recess formed by partially recessing the base substrate corresponding to the second area and wherein the recess is filled with the soft material.

5. The window panel of claim 1, further comprising at least one soft layer disposed on the base substrate and comprising the soft material.

6. The window panel of claim 5, wherein the at least one base substrate and the at least one soft layer are alternately stacked.

7. The window panel of claim 6, further comprising a flexible cover film disposed on the soft layer, wherein the flexible cover film has a rigidity greater than a rigidity of the soft layer.

8. The window panel of claim 1, wherein the soft material comprises a silica ball.

9. The window panel of claim 1, wherein the soft material has a refractive index substantially similar to a refractive index of the rigid material.

10. The window panel of claim 1, wherein the soft material comprises a polymer resin.

11. The window panel of claim 1, wherein the rigid material comprises a glass or a rigid resin film.

12. A display apparatus comprising:
a display panel that displays an image; and
a window panel disposed on the display panel to protect the display panel, the window panel comprising:
a base substrate comprising a first rigid part including a rigid material, a second rigid part including the rigid material, and a folding part interposed between the first and second rigid parts and configured to be folded by an external force, wherein the folding part comprises a first area and a second area alternately arranged on a plane surface of the folding part substantially perpendicular to a thickness direction of the base substrate, the first area comprising the rigid material, and at least a portion of the second area comprising a soft material.

13. The display apparatus of claim 12, wherein the first and second rigid parts are arranged in a first direction, the first and second areas are extended in a second direction substantially perpendicular to the first direction and alternately arranged in the first direction.

14. The display apparatus of claim 13, wherein the folding part comprises a hole formed through the base substrate corresponding to the second area and wherein the hole is filled with the soft material.

15. The display apparatus of claim 13, wherein the folding part comprises a recess formed by partially recessing the base substrate corresponding to the second area and wherein the recess is filled with the soft material.

16. A method of manufacturing a window panel, comprising:
- disposing a base substrate comprising a rigid material and a mother substrate, the base substrate comprising a first rigid part, a second rigid part, and a folding part disposed between the first and second rigid parts and configured to be folded by an external force;
- etching at least a portion of the base substrate in a second area on a plane surface substantially perpendicular to a thickness direction of the base substrate;
- filling the etched at least portion of the second area with a soft material having a flexibility; and
- separating the mother substrate from the base substrate.

17. The method of claim 16, further comprising distributing silica balls in the soft material.

18. The method of claim 16, further comprising providing the soft material on the base substrate to form a soft layer on the base substrate.

19. The method of claim 18, further comprising forming a cover film on the soft layer, wherein the cover film has a flexibility and a rigidity greater than a rigidity of the soft material.

\* \* \* \* \*